UNITED STATES PATENT OFFICE.

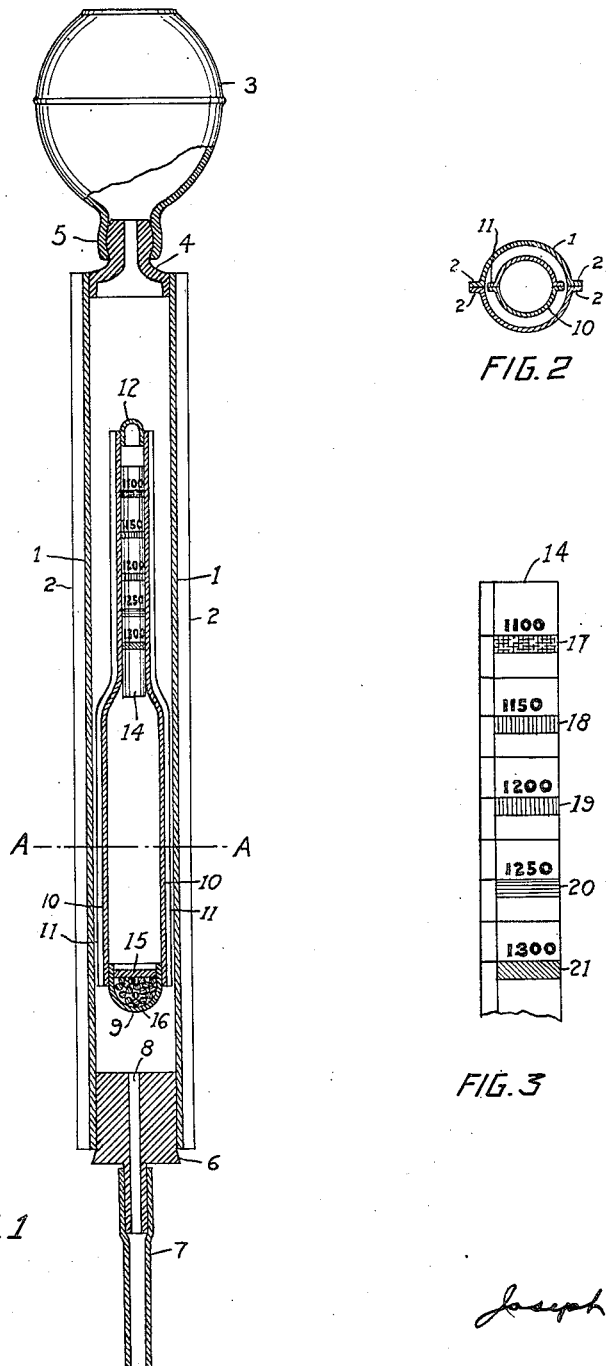

JOSEPH O. LUTHY, OF SAN ANTONIO, TEXAS.

HYDROMETER.

1,424,108.

Specification of Letters Patent.  Patented July 25, 1922.

Application filed September 22, 1916. Serial No. 121,617.

*To all whom it may concern:*

Be it known that I, JOSEPH O. LUTHY, a citizen of the Republic of Switzerland, residing in the city of San Antonio, county of Bexar, and State of Texas, have invented certain new and useful Improvements in Hydrometers; and I do hereby declare the following to be a full, clear, and exact description of the invention, such as will enable others skilled in the art to which it appertains to make and use the same.

This invention relates to hydrometers and similar measuring instruments, and has for its object to provide a simple, durable and efficient instrument of the kind indicated, which is practically non-breakable, not subject to attack from liquids in which it is employed, which is provided with means to prevent it adhering to the sides of the vessel or container in which it is used, so that the scale may be readily observed in any position of the device, and which will involve a smaller error due to temperature variations, than hydrometers of glass or similar materials, and what is more important, the error constituting in effect a factor of safety as contradistinguished from the error due to glass, as will be hereinafter more particularly explained. To this end, the invention comprises a hydrometer or the like in which the shell or body portion is formed of celluloid, preferably of two homologous sections joined along their longitudinal meeting edges, which latter are preferably flanged outwardly to provide wings or fins which afford extended surfaces for effecting the jointure of the sections, and which also prevent the instrument rotating in the liquid of submersion and adhering to the sides of the containing vessel in a position to obscure the scale or markings carried by the hydrometer.

The invention is illustrated in the accompanying drawings, in which,

Fig. 1 is a vertical sectional elevation of a bulb syringe associated with one of the improved hydrometers.

Fig. 2 is a horizontal section on line *a—a* of Fig. 1.

Fig. 3 is an enlarged fragmentary elevation of a form of scale employed with the hydrometer.

In the particular application of the hydrometer illustrated in the accompanying drawings, the same is shown as employed with a suction syringe, such as is commonly used in testing solutions of various kinds, by withdrawing portions of the solution into the syringe so that the hydrometer floats in the solution contained in the syringe and, according to the depth of immersion, indicates on the associated scale the density or specific gravity of the liquid.

Referring to the drawings, 10 indicates the shell or body of the hydrometer, which is preferably of bottle shape, involving a lower enlarged tubular portion with an upper constricted neck, said body portion preferably formed of two homologous sections of celluloid or equivalent material, which are pressed or molded to form half sections of the body, provided with outwardly extending flanges 11 along their outer edges, which flanges are brought together and cemented by a suitable adhesive or binding agent, such as amyl acetate. The upper end of the tubular body portion is closed by a suitable cap 12, which may, if desired, be of celluloid or like material properly cemented to the body, and a cup or cap 9 of similar material constitutes the bottom closure, as well as the receptacle for the balancing weight ordinarily employed in hydrometers, and which in the present instance is constituted by lead shot 16 or other suitable material, which are held in place by a sealing washer 15 cemented to the cup 9, as shown.

Within the neck of the hydrometer, there is secured a scale 14, which is provided with suitable indexes in the form of figures and markings, constituting a readable scale. The character of the markings may be varied in accordance with the particular class of work in which the instrument is employed, and as one of the most general fields of employment is determining the specific gravity of the fluid electrolyte of secondary or storage batteries, the form of scale indicated in the present instance has reference to this latter line of work, with the numerals printed above the lines of the scale, associated with suitable bands or markings of contrasting colors, as for example, a yellow band 17 adjacent the 1100 mark on the scale, a red band 18 adjacent the 1150 mark, a pink band 19 adjacent the 1200 mark, a blue band 20 adjacent the 1250 mark, and a green band 21 adjacent the 1300 mark, the colors as well as the figures serving to afford readily visible indexes, the red and yellow indicating danger, the pink caution, the blue safety, and the green full charge, when the instrument is used for testing battery fluids. It will be understood, of course, that other appropriate markings may be employed when the device is used for testing other fluids. The scale is preferably printed on paper, rolled in the form of a cylinder and cemented in proper calibrated relation within the neck of the hydrometer, as shown.

A convenient form of syringe for use in connection with a hydrometer of this character involves a body portion 1, which is preferably formed of celluloid or similar material, in substantially the same manner as the body or shell portion of the hydrometer, that is to say, of two homologous sections having longitudinal edge flanges 2, 2, which are jointed together to form the tubular body. The upper end of the body 1 is provided with a nipple 4, to receive the neck portion 5 of a soft rubber bulb 3. The lower end of the syringe is closed by a stopper 6 provided with a longitudinal perforation or duct to which is connected a short section of tubing 7, which latter is adapted to be dipped into the liquid to be drawn up into the body of the syringe when the bulb 3 is compressed and then permitted to expand, according to the usual mode of operation of these syringes.

The advantages of a hydrometer constructed as hereinbefore described are manifold, and among the many advantages, the following may be mentioned. The instrument is practically non-breakable, and is unaffected by any of the ordinary liquids in which it may be immersed. The celluloid or equivalent material of which the body of the device is made lends itself admirably to accurate molding of the parts so that all of the elements of the shell may be made in quantities and essembled by labor which is not of the highly expert class required to make similar instruments of glass or like material. The formation of the outwardly extending flanges on the sections of the body portion, not only affords an effective means for joining the sections together, but also constitutes fins or resistance elements which prevent the hydrometer rotating in the liquid of submersion, or adhering to the sides of the containing syringe or vessel in a position to prevent the indications on the scale being readily observed. A very important and valuable feature of the hydrometer, made of celluloid, as described, resides in the fact that the errors or variations in the readings are much less than are those of a hydrometer of glass or similar material, and what is more important, especially in battery work, the errors or variations constitute an element or factor of safety, whereas in the case of a glass hydrometer, the errors really increase the danger factor. To illustrate by a concrete example, it has been found that with a glass hydrometer on one hand and a celluloid hydrometer, made in accordance with the invention, on the other, both calibrated at a temperature of 80°, the error or variation due to the glass instrument is much larger for both higher and lower temperatures than the error or variation of the celluloid instrument. As the temperature of the liquid increases, a glass hydrometer indicates the gravity or density of the liquid as less than it actually is. For example, if in charging a storage batery, full charge is indicated by 1275 on the hydrometer scale, at 60° F., when the temperature of the battery fluid reaches 100, the glass hydrometer indicates 1262 on the scale or 13 points lower than the true reading, so that the operator would, if he followed the hydrometer indication, continue to charge the storage battery beyond the full or normal charge. Under the same conditions, with a celluloid hydrometer of the character described, the error or variation would actually constitute an element of safety, inasmuch as the hydrometer would show the gravity or density greater than it actually is, for temperatures higher than that of calibration, and less than it actually is for lower temperatures. For example, the celluloid hydrometer when immersed in the fluid of the battery under full charge and at 60° F. sinks to the 1250 mark on the scale, and the same instrument placed in the same fluid at 100° F. will indicate 1288 or an excess charge. In both instances, the battery is actually at normal full charge which should give an indication of 1275 on the scale. The celluloid hydrometer therefore admits of a slight excess charge at the lower temperature, but gives a positive warning against excess charge at all temperatures above normal. As overcharge always unduly heats the battery, it is obvious that these indications of the celluloid instrument are a direct and positive check against overcharging. When the solutions are cold and in danger of freezing or sulphating, the advantages of the celluloid instrument over the one made of glass are also material and cogent. For example, in ascertaining the density of liquids under low temperature, the glass hydrometer gives a higher reading than the proper one and the celluloid instrument indicates a density lower than it actually is. With the glass hydrometer, therefore, under conditions of low temperature, the danger would be passed before the instrument gave a proper indication, but, on the other hand, the celluloid instrument would show the danger indication before the danger point due to reduction in density or specific gravity had been reached.

Although the foregoing description of the specific mode of constructing the hydrometer defines the preferred form of apparatus, it will be obvious that changes in the character and construction of the instrument and its accessories may be made without departing from the broad spirit of the invention, the essentially novel feature of which involves the construction of the shell or body of the hydrometer of celluloid or equivalent material, which possesses the inherent advantages and produces the materially improved and unexpected results hereinbefore set forth.

What I claim is:—

1. A hydrometer or the like, comprising a shell or body portion of celluloid.

2. A hydrometer or the like, comprising a shell or body portion of celluloid, and closure caps secured to the ends of said shell.

3. A hydrometer or the like, comprising a shell or body portion of celluloid formed of two homologous sections joined together at their meeting edges.

4. A hydrometer or the like, comprising a shell or body of celluloid formed of two homologous sections, having edge flanges secured together.

5. A hydrometer or the like, comprising a shell or body of celluloid formed of two homologous sections, having outwardly extending flanges secured together.

6. A hydrometer or the like, comprising a tubular shell or body portion formed of two homologous sections having outwardly extending edge flanges secured together and closure caps secured to the ends of said shell.

7. A hydrometer or the like, comprising a tubular shell or body of celluloid, having laterally projecting wings or flanges to prevent rotation of the instrument in the fluid of submersion.

In testimony whereof I affix my signature, in presence of two witnesses.

JOSEPH O. LUTHY.

Witnesses:
  YALE HICKS,
  T. J. MOONEY.